:::

United States Patent
Harmer et al.

(10) Patent No.: US 7,752,226 B1
(45) Date of Patent: Jul. 6, 2010

(54) REVERSE PATHNAME LOOKUP BY INODE IDENTIFIER

(75) Inventors: Craig K. Harmer, San Francisco, CA (US); Rebanta Mitra, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1794 days.

(21) Appl. No.: 10/327,461

(22) Filed: Dec. 20, 2002

(51) Int. Cl.
*G06F 17/30* (2006.01)

(52) U.S. Cl. ........................ 707/796; 707/803
(58) Field of Classification Search .............. 707/3, 707/10, 102
See application file for complete search history.

(56) References Cited

U.S. PATENT DOCUMENTS

| | | | | |
|---|---|---|---|---|
| 5,175,852 | A * | 12/1992 | Johnson et al. | 707/8 |
| 5,566,328 | A * | 10/1996 | Eastep | 707/102 |
| 5,771,379 | A | 6/1998 | Gore, Jr. | 707/100 |
| 5,875,444 | A | 2/1999 | Hughes | 707/1.2 |
| 6,321,219 | B1 * | 11/2001 | Gainer et al. | 707/3 |
| 6,643,654 | B1 * | 11/2003 | Patel et al. | 707/10 |
| 6,895,413 | B2 | 5/2005 | Edwards | 707/202 |
| 6,938,039 | B1 * | 8/2005 | Bober et al. | 707/8 |
| 2004/0128427 | A1 * | 7/2004 | Kazar et al. | 711/4 |
| 2004/0133608 | A1 * | 7/2004 | Saake et al. | 707/200 |
| 2004/0236798 | A1 * | 11/2004 | Srinivasan et al. | 707/200 |

OTHER PUBLICATIONS

Zhang et al, "Cross-Partition Protocols in a Distributed File Service", May 23, 2001,Hewlett Packard Company, p. 1-21.*
"System Administration Commands, ncheck," Sun Microsystems, Inc., May 30, 2001, 2 pages.
"System Administration Commands, ff," Sun Microsystems, Inc., Feb. 10, 2001, 2 pages.
"The VxFS Disk Structure," VERITAS File System (VxFS) V1.2—Administrator's Guide, VERITAS, Nov. 15, 2002, 5 pages.
UNIX Power Tools, "How Does UNIX Find Your Current Directory," Chapter 14, Nov. 11, 2002, 5 pages.
"VERITAS Storage Foundation, Technical Overview," VERITAS, Apr. 2002, pp. 1-28.
"File System, White Paper," VERITAS Software Corporation, Nov. 1996, 19 pages.

* cited by examiner

*Primary Examiner*—Cam-Linh Nguyen
(74) *Attorney, Agent, or Firm*—Robert C Kowert; Meyertons, Hood, Kivlin, Kowert & Goetzel, P.C.

(57) ABSTRACT

Information identifying the inode of the parent directory of a file may be stored in that file's inode. A reverse pathname lookup from the file's inode identifier may be performed by reading a parent directory inode identifier of the file's parent directory from the file's inode and using the parent directory inode identifier to generate a pathname for the file. Generating the pathname may involve identifying the filename of the file by searching the parent directory identified by the parent inode identifier for the file's filename. A file's inode may include more than one parent directory inode identifier.

22 Claims, 5 Drawing Sheets

REVERSE PATHNAME LOOKUP BY INODE IDENTIFIER

BACKGROUND

1. Field of the Invention

This invention relates to computer systems and, more particularly, to identifying pathnames within a file system.

2. Description of the Related Art

File systems organize and manage information stored in a computer system. Typically, information is stored in the form of files. File systems may support the organization of user data by providing and tracking organizational structures such as folders and directories. The file system may interpret and access information physically stored in a variety of storage media, abstracting complexities associated with the tasks of locating, retrieving, and writing data to the storage media.

Files are typically located by specifying a path to that file. The path may indicate which directories or folders include that particular file. A typical path is a sequence of directory or folder names, starting at the file system's root directory, and ending with the name of the file or directory being identified.

In some operating environments such as UNIX, information about each file in the file system is kept in a metadata structure called an inode. The inode contains metadata, which includes a pointer to the physical blocks containing the data in the file and information indicating the type of file, the permission bits, the owner and group, the file size, and the file modification date and time.

An inode does not include the filename of the file to which the inode corresponds. Because of this, it is relatively difficult to determine the filename of a file, given only information identifying that file's inode. For example, in UNIX, programs such as ff(7) and ncheck(1M) provide mechanisms for determining the pathname of a file from an inode identifier (also referred to as a performing a reverse pathname lookup) by scanning each directory in the file system for the inode identifier. Scanning each directory may take an undesirable amount of time.

SUMMARY

Various embodiments of systems and methods for storing information identifying the parent directory of a file in that file's inode are disclosed. In one embodiment, a method may involve: reading the inode identifier of a parent directory of a file from an inode associated with the file; and using the parent directory's inode identifier to generate a pathname for the file. Generating the pathname may involve identifying the filename of the file by searching the parent directory, as identified by the parent directory's inode identifier, of the file for the file's inode identifier in order to retrieve the file's filename. In some embodiments, such a method may involve reading several parent directories' inode identifiers from the inode associated with the file and generating several pathnames for the file.

If a new inode is allocated for a new file, a parent directory mode identifier identifying the parent directory of the new file may be stored in the new inode. If a link is created to that file, an additional parent directory inode identifier identifying an additional parent directory of the new file may be stored in the new inode. The additional parent directory inode identifier may be stored in an extended area of the new inode in some embodiments. The additional parent directory inode identifier may be removed from the new inode if the link to the new file is removed.

In one embodiment, a system may include a processor and a memory. The memory may store program instructions executable by the processor to implement a file system. The file system may maintain an inode table of several inodes. One of the inodes is associated with a file and includes the inode identifier of a parent directory of the file. The file system may include a routine to generate the pathname of the file from an inode identifier identifying the inode associated with the file. In some embodiments, the inode associated with the file may include inode identifiers for several parent directories of the file. In such embodiments, the routine may generate a pathname for each of the inode identifiers included in the file's inode. The routine may also verify each pathname after generation.

A computer readable medium may store program instructions that are computer executable to retrieve a parent directory inode identifier of a parent directory of a file from an inode associated with the file. The program instructions are also computer executable to use the parent directory inode identifier to generate a pathname for the file.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
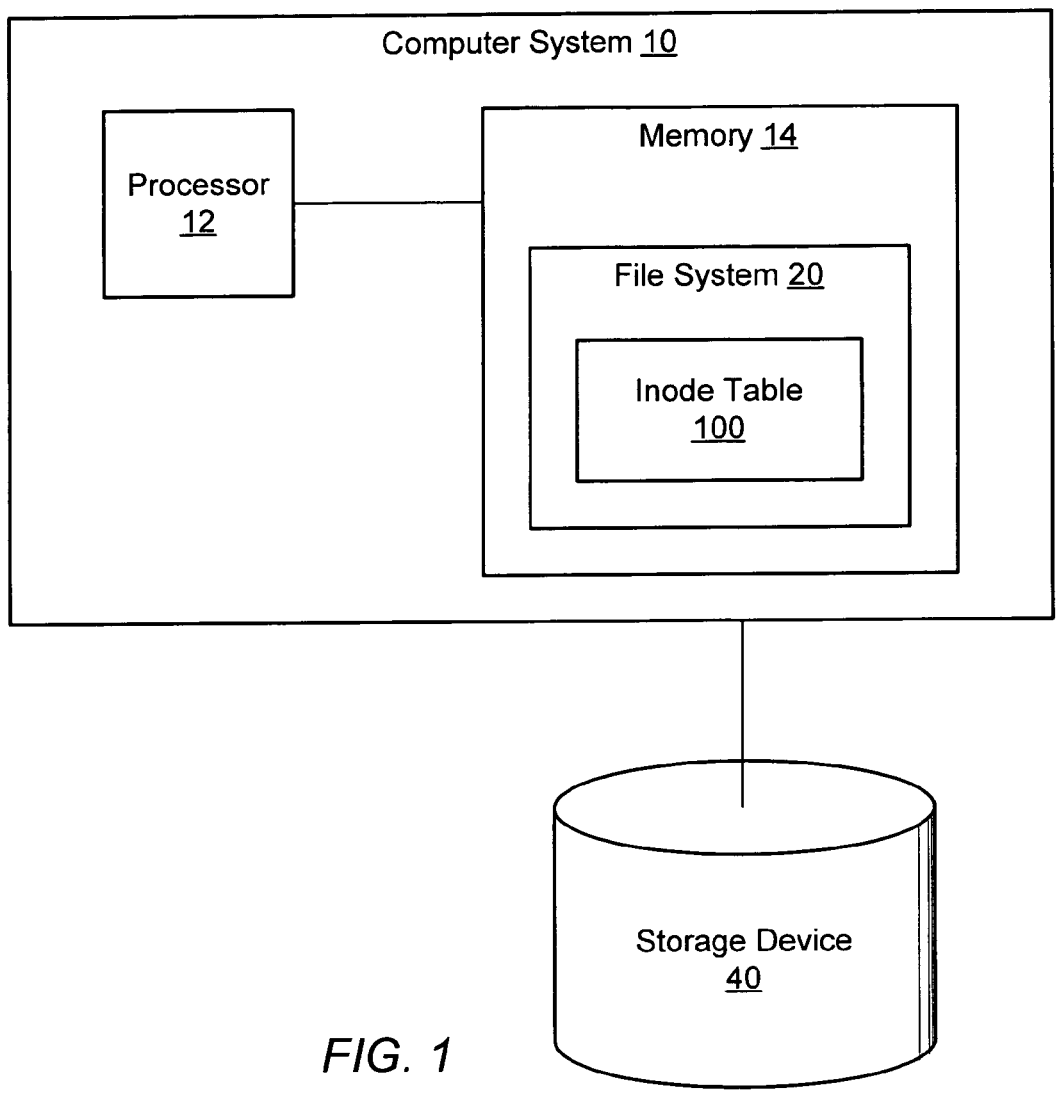
FIG. 1 illustrates a computer system, according to one embodiment.

FIG. 1 shows a block diagram of a computer system 10 that includes a file system 20. In the illustrated embodiment, instructions and data implementing file system 20 are stored in memory 14 and executed by processor 12. File system 20 may be part of a distributed file system used to organize data accessed by various components of a networked computer system. In such embodiments, file system 20 may be executed on one system (e.g., a file server) and accessed by other systems (e.g., user workstations coupled to the file server by a local area network). In other embodiments, file system 20 may be implemented and used within a single computer system 10.

File system 20 manages data stored within storage device 40. Storage device 40 may be a mass storage device such as a hard disk, flash memory, CD-ROM (Compact Disc Read Only Memory), or DVD (Digital Versatile Disc) ROM. Storage device 40 may also include a combination of such devices. In some embodiments, storage device 40 may include one or more arrays of such storage devices. For example, storage device 40 may include a RAID (Redundant Array of Independent Disks) subsystem. Additionally, storage device 40 may include storage devices accessible to computer system 10 via a network such as a LAN (Local Area Network) or SAN (Storage Area Network). Storage device 40 may be an object-based storage device (OBSD) or support hash-addressable storage (a device in which a block of data is identified by a unique hash of the contents of the block) in some embodiments.

File system 20 includes an inode table 100 that includes several inodes. Inode table 100 stores metadata associated with each file in an inode. The metadata in each inode allows file system 20 to locate the file data associated with that inode within storage device 40. Exemplary types of files that may be managed by file system 20 include regular files (e.g., text or binary data files), directory files (files which include other files and/or directories), executable files, symbolic links (files which point to other files), device special files (files which provide an interface to hardware), sockets (files which provide an interface to a network program), and named pipes (files which provide access to other programs). Inode table 100 in memory 14 is an example of a means for storing inodes. Note that as used herein, the term "inode" describes any structure that stores file metadata identifying the location of the file's data within a storage device. For example, a location may be identified by the object name of one or more storage objects in an OBSD or a unique hash of the contents of a block of storage in a hash-addressable storage device. Other names often used to describe such structures include file nodes, file reference numbers, and snodes. In some types of file systems, an inode table is described as a master file table.

Figure 2A:
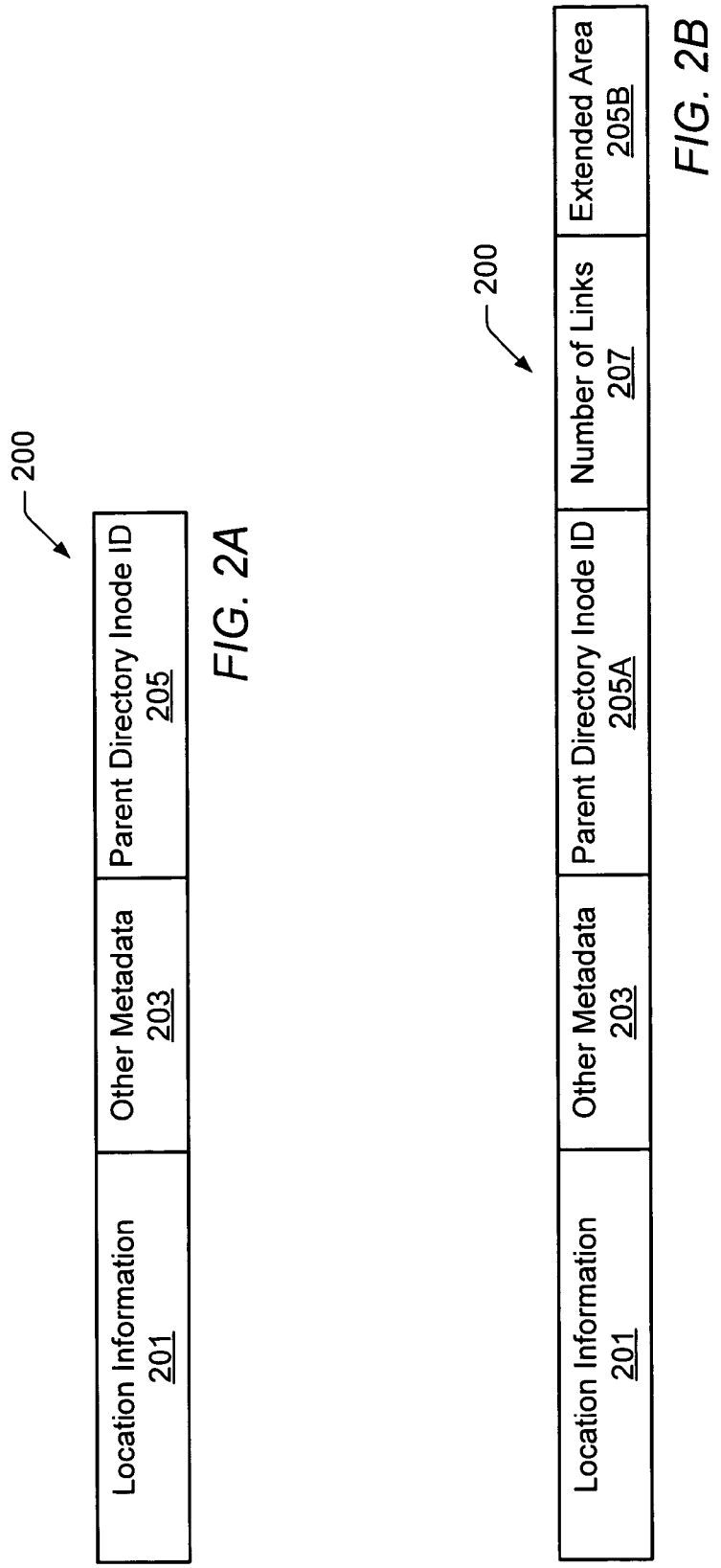
FIG. 2A illustrates an inode, according to one embodiment.

FIG. 2A illustrates an inode 200 that may be included in inode table 100, according to one embodiment. As illustrated, an inode 200 may include the information 201 indicating the physical location of its associated file data. This information may include one or more pointers to the blocks within storage device 40 that store the data making up the file represented by the inode 200. Additionally, an inode 200 may include other metadata 203, which may indicate permissions, file type, owner and/or group information, file size, and/or file modification date and time for the associated file.

Each inode 200 within inode table 100 is identified by a unique inode identifier. Inodes are commonly identified by an inode number or position within the inode table. Generally, given an inode identifier, the file system 20 may directly access the identified inode in inode table 100.

The filename of each file managed by file system 20 may be associated with the inode identifier of that file's associated inode. Multiple filenames may be associated with the same inode identifier. One mechanism for associating inode identifiers with filenames is provided by directory files. Directory files typically store the filename and inode identifier of each file (including other directory files) included in that directory. Accordingly, given the pathname to a file, the file system 20 may locate the file on storage device 40 by searching for the file's filename in its parent directory and using the associated inode identifier, found in the parent directory, to access the file's inode within inode table 100.

In order to perform a reverse pathname lookup operation to identify a pathname to a file based on that file's inode identifier, file system 20 may store additional information in a file's inode. As shown in FIG. 2A, an inode 200 may also include the inode identifier 205 of the associated file's parent directory. Since each directory includes the filename and inode identifier of each file included within that directory, having the inode identifier of the file's parent directory allows a reverse pathname lookup routine included in the file system 20 to quickly identify which directory to search for the file's filename without having to access each directory managed by the file system. After retrieving the inode identifier of the file's parent directory (or directories, in some cases) from the file's inode, the reverse pathname lookup may be performed by searching the identified directory for the file's inode identifier in order to retrieve the file's filename.

Since the file's parent directory may itself be a subdirectory of another directory, several directories may need to be accessed in order to generate the entire pathname during a reverse pathname lookup. In many embodiments, information about the file's parent directory's parent directory, if any, may be included in the file's parent directory. For example, in UNIX systems, a directory file includes two entries: '.' (dot) and '..' (dotdot). The first entry, dot, identifies the inode of the directory itself. The second entry, dotdot, identifies the inode for the parent directory of that directory (except in the root directory, where the two entries are equal). Thus, the file system 20 may generate the remaining portion of the file's pathname by accessing the parent directory to find the inode identifier of that directory's parent directory, if any, accessing the directory's parent directory to determine the directory's name, and so on until the root directory is reached. Note that in some embodiments, a directory file's inode may include a parent directory inode identifier, allowing a reverse pathname lookup for the directory to be performed without having to open the directory file itself. However, in other embodiments, only inodes for non-directory files may include parent directory inode identifiers.

In embodiments in which file system 20 supports multiple links to files, a file may have several pathnames. A link is created each time a filename is associated with a particular file (e.g., by associating the filename with the file's inode identifier within a parent directory). Multiple links to a file may exist if the same file is referenced by several different filenames and/or is included in several different parent directories. For example, multiple links may exist if more than one filename within the same directory is associated with a single file. Alternatively, multiple links may exist if more than one different filename, each of which is created within a different directory, is associated with the same file. In yet other situations, multiple links may exist if the same filename in several different directories is associated with the same file. The file system 20 may maintain a single inode for a file, regardless of how many links to that file exist.

Figure 2B:
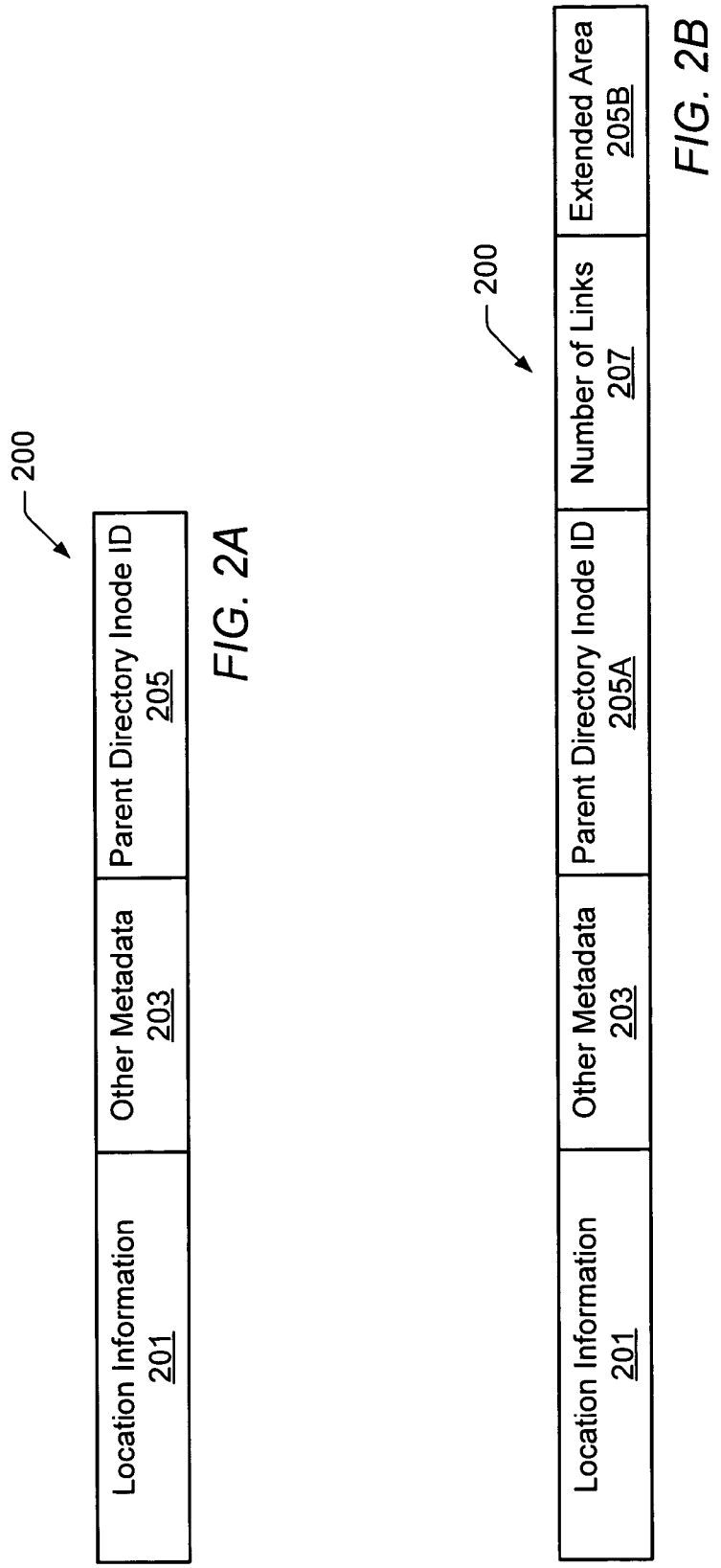
FIG. 2B illustrates an inode, according to another embodiment.

In embodiments in which multiple links are supported, a file's inode may include multiple parent directory inode identifiers. In the embodiment of FIG. 2B, an inode may have one parent directory inode identifier field 205A that stores one inode identifier. Additional inode identifiers, if any, may be stored in an extended area 205B to the inode. An inode 200 may also include information 207 indicating the current number of links to the associated file. Note that in other embodiments, all parent directory inode identifiers may be stored within the inode in the same way (e.g., all may be stored within an extended area, or all may be stored within parent directory inode identifier fields in the inode). Additionally, since many files may not have links, many files may not include more than one parent directory inode identifier. Accordingly, a default amount of space just large enough to store all of the inode information plus a single parent directory inode identifier may be allocated to each inode when the file with which that inode is associated is created. If additional links are later created to that file, the amount of space allocated to that file's inode may be increased to store an additional parent directory inode identifier (e.g., in an extended area 205B to that file's inode).

In some situations, multiple filenames within the same directory may refer to the same file. In some embodiments, a copy of that directory's inode identifier may be stored in that file's inode for each different filename. In other words, if two filenames within a directory refer to the same file, that file's inode may include two copies of the directory's inode identifier. When performing a reverse pathname lookup for a file, the file system 20 may determine whether there are multiple copies of the same parent directory inode identifier in the file's inode. If so, the file system 20 may be configured to retrieve that same number of filenames from that parent directory. In other embodiments, a single copy of the parent directory inode identifier may be present in the file's inode, regardless of how many links there are in that directory to that file. In such embodiments, the file system 20 may be configured to compare each inode identifier in that directory to the file's inode identifier in order to detect each of the file's filenames within that directory.

Figure 3A:
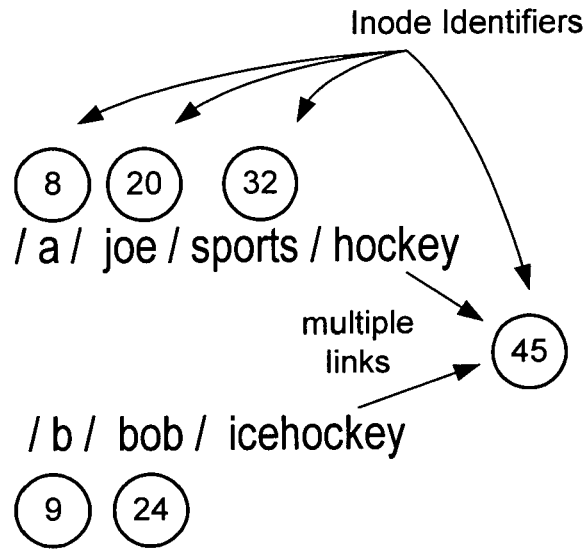
FIGS. 3A-3B illustrate pathnames to a file and the inode associated with that file, according to one embodiment.
Figure 3B:
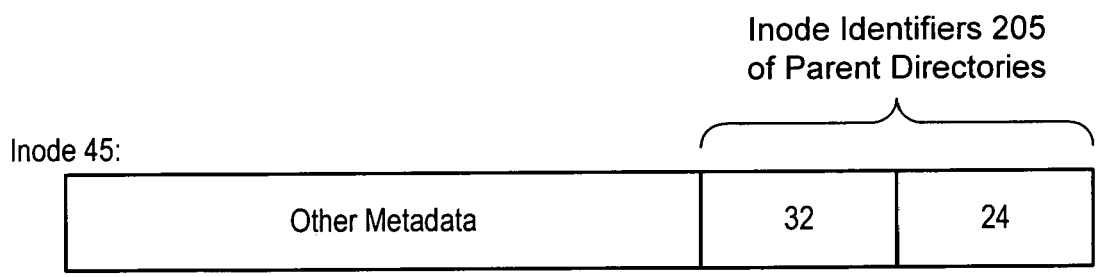

FIGS. 3A-3B illustrate how an inode may include inode identifiers of more than one parent directory. In this example, there are two pathnames to the same file, as shown in FIG. 3A. The file inode is identified as inode 45. In the first pathname, the file is named "hockey" and is included in the directory named "sports." The inode for the "sports" directory is inode 32. The "sports" directory is a subdirectory of the "joe" directory (inode 20), which is in turn a subdirectory of the "a" directory (inode 8). The "usr" directory is a subdirectory of the root directory. In the second pathname, the file is named "icehockey" and is included in directory "bob" (inode 24), which is a subdirectory of the "b" directory (inode 9). FIG. 3B illustrates how inode 45 may store parent directory inode identifiers 205 for both the "sports" directory and the "bob" directory, in addition to storing other metadata for the file.

Figure 4:
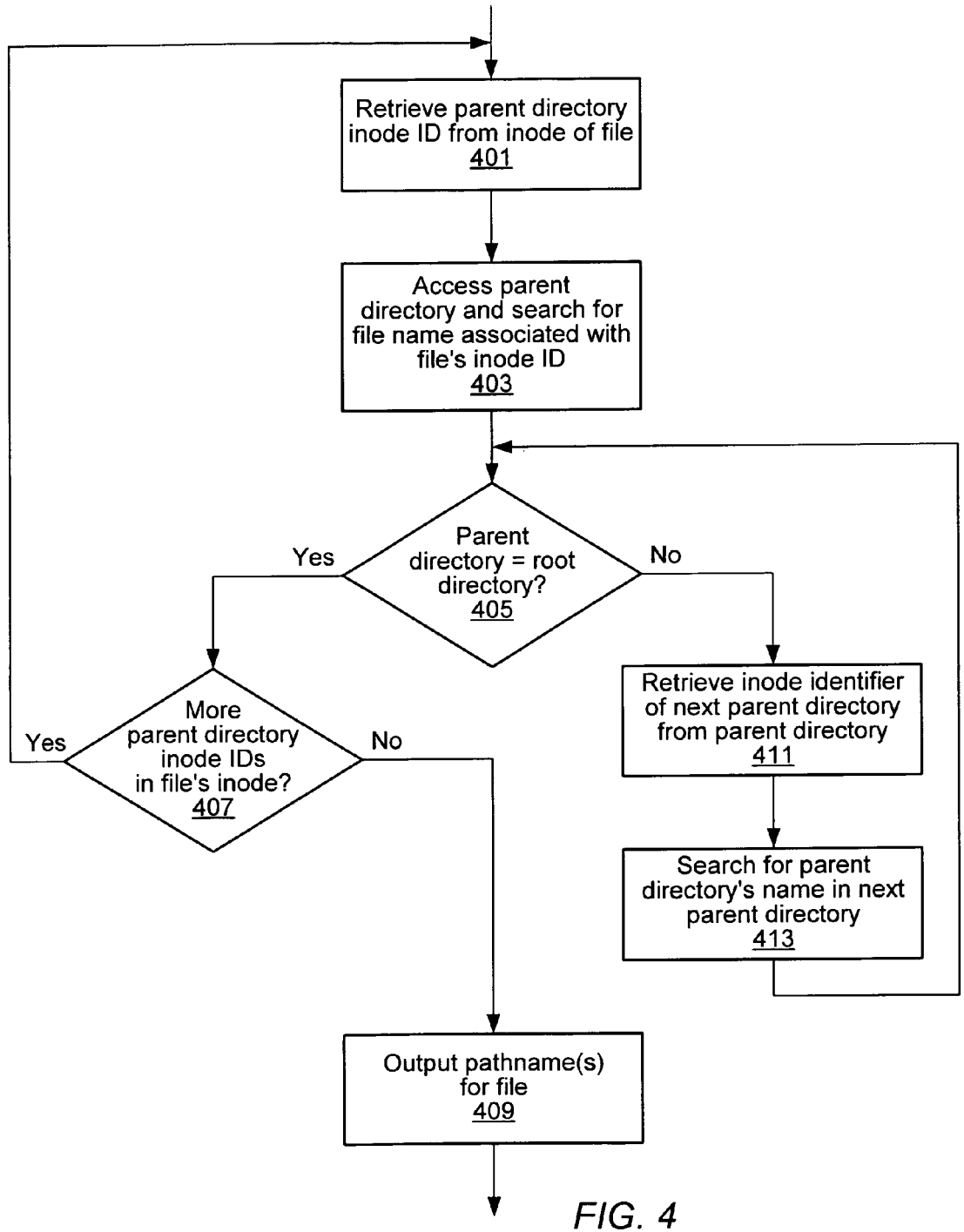
FIG. 4 is a flowchart of one embodiment of a method of generating a pathname from an inode identifier.

FIG. 4 illustrates one embodiment of a method of performing a reverse pathname lookup from a file's inode identifier. The file's inode identifier is used to access the file's inode within an inode table. At 401, the inode identifier of the file's parent directory is retrieved from the file's inode. Given the identifier of the file's parent directory's inode, the parent directory may be opened at 403 and the filename of the file may be determined by searching the directory for the filename associated with the file's inode. The filename may be stored in a temporary buffer in some embodiments. If the parent directory is the root directory, as determined at 405, and if there is only one parent directory inode identifier in the file's inode, as determined at 407, the pathname for that file may be output (e.g., from a temporary buffer in which the filename was stored at 403) at 409.

If the parent directory identified in the file's inode is not the root directory, additional directory filenames may need to be determined in order to generate the full pathname for the file. Accordingly, the parent directory's filename may be determined by accessing the parent directory's parent directory, as shown at 411 and 413. The parent directory's parent directory (or "next" parent directory as described in the flowchart of FIG. 4) may be identified from information in the parent directory (e.g., in a '..' entry) or from a parent directory inode identifier included in the parent directory's inode, depending on the embodiment. Functions 405, 411, and/or 413 may be repeated until the root directory is reached. Each filename determined at 413 may be temporarily buffered (e.g., in the same buffer used to store the filename determined at 403) during performance of the reverse pathname lookup operation and then assembled to produce the complete pathname.

If there are any additional parent directory inode identifiers included in the file's inode, more than one pathname may be generated for that file by repeating functions 401, 403, and/or 405 for each parent directory inode identifier. If there are multiple copies of a single parent directory inode identifier (i.e., due to there being multiple links to the file from that parent directory), each filename within the identified parent directory may be retrieved from the parent directory during a single access to the parent directory in some embodiments. In one such embodiment, the filenames may be found by sorting the parent directory inode identifiers in the file's inode and processing the identical parent directory inode identifiers at the same time. If multiple filenames are determined at 403, each may be buffered temporarily during performance of the reverse pathname lookup. Once all pathnames for the file have been determined, the pathnames may be output to a user or requesting application or process. Alternatively, each pathname may be output individually as that pathname is determined.

Note that while the embodiment illustrated in FIG. 4 returns multiple pathnames, some embodiments may return fewer than all pathnames when performing a reverse pathname lookup. One embodiment may return a single pathname each time a reverse pathname lookup is performed. For example, in such an embodiment, the reverse pathname lookup operation may only return one pathname generated by using the parent directory inode identifier stored in a field 205A in the file's inode and may not access the parent directory inode identifiers stored in an extended area 205B to the file's inode.

Additionally, note that certain operations may occur during the performance of a reverse pathname lookup operation that affect the correctness of the pathnames generated by the reverse pathname lookup. For example, a reverse pathname lookup may be performed for a file whose pathname is initially /a/b/c/d/e/fu. While the reverse pathname lookup is being performed, a user may perform the following rename operations:

rename /a/b/c/d/e/fu /a/b/c/d/ha/fu rename /a/b/ a/jj

Depending on the times at which each rename operation completes relative to the progress of the reverse pathname lookup operation, the reverse pathname lookup may generate an incorrect pathname such as /a/jj/c/d/e/fu, which never actually existed. In order to avoid such inconsistencies, the file system 20 may be configured to verify pathname(s) generated by the reverse pathname lookup operation prior to outputting those pathname(s) to a user or other process or application. If a pathname generated by the reverse pathname lookup operation is incorrect, the reverse pathname lookup operation may be repeated until the pathname(s) are verified as being correct.

In some embodiments, finding a filename may not involve accessing the file's parent directory. Instead, the filename may be determined by searching a cache (e.g., a DNLC (Directory Name Lookup Cache)) based on the file's inode identifier and the parent directory inode identifier included in that file's inode. If the filename is not found in the cache, the filename may be located by searching the file's parent directory, as described above.

Figure 5:
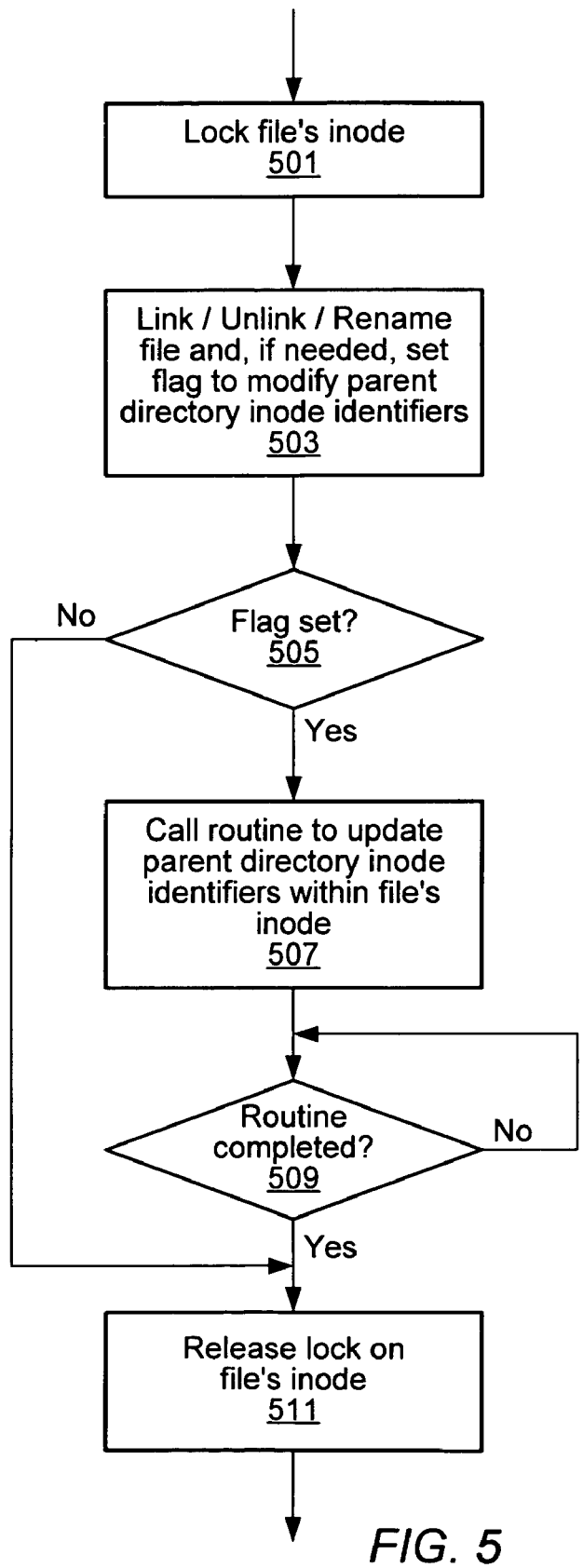
FIG. 5 is a flowchart of one embodiment of a method of maintaining parent directory inode identifiers within a file's inode.

Since the parent directory inode identifiers 205 stored in a file's inode 200 may need to be updated in response to operations that rename, link, unlink, or otherwise to operate on that file, file system 20 may include one or more routines that keep the parent directory inode identifiers 205 up to date. FIG. 5 illustrates one embodiment of a method of maintaining correct parent directory inode identifiers within a file's inode. In this embodiment, various link, unlink, and/or rename operations may affect the parent directory inode identifiers within a targeted file's inode. When such an operation is performed, a lock may be obtained on the targeted file's inode in order to prevent other processes from accessing (e.g., renaming, linking, or unlinking) the file's inode while that operation is being performed, as indicated at 501. If the operation potentially modifies the parent directory inode identifiers (e.g., stored in an extended area of the file's inode), the operation may set a flag associated with the inode, as shown at 503. After completion of the rename, link, and/or unlink function that obtained the lock at 501, the file system may call a routine that performs any operations necessary to maintain correctness of the parent directory inode identifiers if the flag is set, as indicated at 505-507. Additionally, the file system may not release the lock (at 511) until that routine has completed, as determined at 509. However, if the original operation did not affect the parent directory inode identifiers, the lock on the file's inode may be released, as indicated at 505 and 511, as soon as the original operation completes.

Routines that may be called at 507 may include routines that add parent directory inode identifiers (e.g., in response to link operations), routines that remove parent directory inode identifiers (e.g., in response to unlink operations), and routines that both add and remove parent directory inode identifiers (e.g., in response to rename operations). In embodiments in which one parent directory inode identifier is stored in a field in the file's inode and other parent directory inode identifiers are stored in an extended area of the inode, some of these routines may be configured to move an inode identifier from the extended area into the field within the file's inode if the parent directory inode identifier currently stored in that field is removed. Such routines may use the current link count in the file's inode to determine whether any actions need to be performed. For example, if a file's inode indicates that the current link count is 1 and an unlink operation is performed, no manipulation of any parent directory inode identifier information may be needed because the file is being removed.

A file system may include one or more routines that perform reverse pathname lookup operations using the parent directory inode identifiers included in inodes, as described above. These routines may be called by various other file system components that know the inode identifier of a file and need to know one or more pathnames for that file. By calling such reverse pathname lookup routines, other file system components may handle files by reference to the files' inode identifiers without needing to also maintain information about the pathnames for those files. Components that may use reverse pathname lookup routines include those used in replication, journaling, and file searching. Routines that perform reverse pathname lookup operations similar to those described above are examples of means for generating a pathname for a file from a parent directory inode identifier included in that file's inode.

Returning to FIG. 1, note that computer system 10 may take various forms, including a workstation, server, mainframe computer system, network appliance, network computer, Internet appliance, personal digital assistant (PDA), embedded device, smart phone, television system, another suitable device, or combinations thereof.

Additionally, note that all or part of a file system application 20 may be stored on various computer accessible media. Examples of computer accessible media include hard disk storage, floppy disk storage, removable disk storage, flash memory, punch cards, magnetic core, and random access memory (RAM). Computer accessible media may include an installation medium, e.g., a CD-ROM or floppy disk. In addition, a computer accessible medium may be included in one computer system that provides the program instructions over a network to another computer system for execution. Thus, various embodiments may further include receiving, sending or storing instructions and/or data implemented in accordance with the foregoing description upon a computer accessible medium. A computer accessible medium may include a communication medium such as network and/or a wireless link on which communication signals such as electrical, electromagnetic, or digital signals are conveyed.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
   in a computer system:
      reading a parent directory inode identifier of a parent directory of a file from an inode associated with the file, wherein the inode associated with the file comprises a storage location pointer for data of the file;
      using the parent directory inode identifier to generate a pathname for the file;
      setting a flag indicating an execution of a file operation on the file;
      in response to the flag being set, determining whether one or more parent directory inode identifiers are to be updated in the inode associated with the file as a result of the file operation; and
      in response to determining that the one or more parent directory inode identifiers are to be updated, updating the one or more parent directory identifiers.

2. The method of claim 1, wherein said using comprises identifying a filename of the file by searching the parent directory of the file for an inode identifier of the file.

3. The method of claim 2, further comprising identifying a parent directory of the parent directory of the file and identifying a name of the parent directory of the file by accessing the parent directory of the parent directory.

4. The method of claim 1, wherein said reading comprises reading a plurality of parent directory inode identifiers from the inode associated with the file; and wherein said using comprises generating a plurality of pathnames for the file.

5. The method of claim 4, wherein said using comprises identifying a plurality of filenames of the file by accessing one or more parent directories of the file identified by the plurality of parent directory inode identifiers.

6. The method of claim 1, further comprising allocating a new inode for a new file, wherein said allocating comprises storing a parent directory inode identifier identifying a parent directory of the new file in the new inode.

7. The method of claim 6, further comprising storing an additional parent directory inode identifier identifying an additional parent directory of the new file in the new inode in response to creating a link to the new file.

8. The method of claim 7, further comprising removing the additional parent directory inode identifier from the new inode in response to the link to the new file being removed.

9. A system, comprising:
   a processor; and
   a memory coupled to the processor and storing program instructions executable by the processor to implement a file system, wherein the file system maintains an inode table comprising:
      a plurality of inodes, wherein an inode of the plurality of inodes is associated with a file and includes: an inode identifier of a parent directory of the file, and a storage location pointer for data of the file; and
   wherein the file system includes a routine to:
      set a flag indicating an execution of a file operation on the file;
      in response to the flag being set, determine whether one or more parent directory inode identifiers are to be updated in the inode associated with the file as a result of the file operation; and
      in response to determining that the one or more parent directory inode identifiers are to be updated, update the one or more parent directory identifiers.

10. The system of claim 9, wherein the file system includes a routine to generate a pathname of the file in response to receiving an inode identifier identifying the inode associated with the file;
   wherein the routine is configured to access the inode associated with the file to retrieve the inode identifier of the parent directory of the file;
   wherein the routine is configured to use the inode identifier of the parent directory to generate the pathname of the file.

11. The system of claim 10, wherein the inode associated with the file stores a plurality of inode identifiers, wherein each of the plurality of inode identifiers identifies a parent directory of the file, and wherein the routine is configured to generate a pathname of the file for each of the plurality of inode identifiers.

12. The system of claim 10, wherein the routine is configured to verify the pathname of the file after generating the pathname.

13. The system of claim 9, wherein each of the plurality of inodes include an inode identifier of a parent directory of an associated file.

14. A computer readable medium storing program instructions, wherein the program instructions are computer executable to:
   retrieve a parent directory inode identifier of a parent directory of a file from an inode associated with the file, wherein the inode associated with the file comprises a storage location pointer for data of the file;
   use the parent directory inode identifier to generate a pathname for the file;
   set a flag indicating an execution of a file operation on the file;
   in response to the flag being set, determine whether one or more parent directory inode identifiers are to be updated in the inode associated with the file as a result of the file operation; and
   in response to determining that the one or more parent directory inode identifiers are to be updated, update the one or more parent directory identifiers.

15. The computer readable medium of claim 14, wherein the program instructions are computer executable to generate the pathname by identifying a filename of the file by searching the parent directory of the file identified by the parent directory inode identifier for an inode identifier associated with the file.

16. The computer readable medium of claim 14, wherein the program instructions are computer executable to retrieve a plurality of parent directory inode identifiers from the inode associated with the file and to generate a plurality of pathnames for the file.

17. The computer readable medium of claim 16, wherein the program instructions are computer executable to generate the plurality of pathnames by accessing a plurality of parent directories if the plurality of parent directory inode identifiers identify more than one parent directory.

18. The computer readable medium of claim 14, wherein the program instructions are computer executable to allocate a new inode for a new file and to store a parent directory inode identifier identifying a parent directory of the new file in the new inode.

19. The computer readable medium of claim 18, wherein the program instructions are computer executable to store an additional parent directory inode identifier identifying an additional parent directory of the new file in the new inode in response to creation of a link to the new file.

20. The computer readable medium of claim 14, wherein the program instructions are computer executable to:
   obtain a lock on the inode associated with the file prior to initiating the execution of the file operation; and
   if the one or more parent directory inode identifiers are to be updated, retain the lock until the one or more parent directory inode identifiers are updated.

21. The computer readable medium of claim 14, wherein the pathname comprises a plurality of directory names, wherein the program instructions are computer executable to:
   verify the pathname of the file after generating the complete pathname.

22. A system, comprising:
   means for storing inodes, wherein each inode is associated with a respective file, and wherein each inode includes: a storage location pointer for data of the file, and an inode identifier of a parent directory of the respective file;
   means for generating a pathname for the respective file by retrieving the inode identifier of the parent directory from the inode associated with the respective file;
   means for setting a flag indicating an execution of a file operation on the respective file;
   means for determining whether one or more parent directory inode identifiers are to be updated in the inode associated with the respective file as a result of the file operation in response to the flag being set; and
   means for updating the one or more parent directory identifiers in response to determining that the one or more parent directory inode identifiers are to be updated.

* * * * *